(12) United States Patent
Cheng

(10) Patent No.: US 11,024,908 B2
(45) Date of Patent: Jun. 1, 2021

(54) ELECTROCHEMICAL DEVICE AND METHOD FOR MANUFACTURING SAME

(71) Applicant: NINGDE AMPEREX TECHNOLOGY LIMITED, Ningde (CN)

(72) Inventor: Wenqiang Cheng, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 71 days.

(21) Appl. No.: 16/230,774

(22) Filed: Dec. 21, 2018

(65) Prior Publication Data

US 2019/0198824 A1    Jun. 27, 2019

(30) Foreign Application Priority Data

Dec. 22, 2017   (CN) .......................... 201711404285.5

(51) Int. Cl.
| | |
|---|---|
| *H01M 50/116* | (2021.01) |
| *H01M 10/0525* | (2010.01) |
| *H01M 10/04* | (2006.01) |
| *H01M 50/124* | (2021.01) |
| *H01M 50/557* | (2021.01) |

(Continued)

(52) U.S. Cl.
CPC ..... *H01M 50/116* (2021.01); *H01M 10/0436* (2013.01); *H01M 10/0525* (2013.01); *H01M 50/124* (2021.01); *H01M 50/557* (2021.01); *H01G 9/08* (2013.01); *H01M 8/2475* (2013.01)

(58) Field of Classification Search
CPC ............. H01M 50/116; H01M 50/124; H01M 50/557; H01M 10/0436; H01M 10/0525; H01M 8/2475; H01M 10/058; H01G 9/08; H01G 11/78; H01G 11/00; H01G 11/84; Y02E 60/10; Y02E 60/50; Y02P 70/50
USPC ......................................................... 429/163
See application file for complete search history.

(56) References Cited

U.S. PATENT DOCUMENTS 7,624,875 B1 * 12/2009  Hine .................... B65D 25/103
                                                         206/470
2007/0074995 A1 *  4/2007  Weisskopf ........... B65D 75/368
                                                         206/705
(Continued)

FOREIGN PATENT DOCUMENTS

| CN | 1753206 | * | 3/2006 | .......... H01M 10/052 |
| CN | 1753206 A | | 3/2006 | |

(Continued)

OTHER PUBLICATIONS

Ningde New Energy Science and Technology Co. Ltd., Notice of First Examination Opinion, CN201910234658.1, dated May 20, 2020, 19 pgs.

*Primary Examiner* — Gary D Harris
(74) *Attorney, Agent, or Firm* — Morgan, Lewis & Bockius LLP

(57) ABSTRACT

The present application relates to an electrochemical device and a method for manufacturing the same. The electrochemical device includes: a first outer case defining an accommodating chamber therein; an electrode assembly accommodated in the accommodating chamber of the first outer case; and a second outer case including a heat shrinkable wrapping layer, the first outer case being wrapped in the heat shrinkable wrapping layer.

19 Claims, 2 Drawing Sheets

(51) Int. Cl.
*H01M 8/2475* (2016.01)
*H01G 9/08* (2006.01)

(56) References Cited

U.S. PATENT DOCUMENTS

| | | | | |
|---|---|---|---|---|
| 2008/0286635 A1* | 11/2008 | Seino | ............ | B32B 15/08 |
| | | | | 429/94 |
| 2009/0256680 A1* | 10/2009 | Kilian | ............ | G06K 7/10178 |
| | | | | 340/10.1 |
| 2009/0321304 A1* | 12/2009 | Watson | ............ | B65D 75/24 |
| | | | | 206/703 |

FOREIGN PATENT DOCUMENTS

| | | |
|---|---|---|
| CN | 204011491 U | 12/2014 |
| CN | 205141031 U | 4/2016 |

* cited by examiner

ELECTROCHEMICAL DEVICE AND METHOD FOR MANUFACTURING SAME

CROSS REFERENCE TO RELATED APPLICATION

The present application claims the benefit of prior Chinese Application No. 201711404285.5, filed with the State Intellectual Property Office of the People's Republic of China on Dec. 22, 2017. The entire contents of the beforementioned patent application are incorporated by reference as part of the disclosure of this U.S. application.

TECHNICAL FIELD

The present application relates to a technical field of batteries, more particularly to an electrochemical device and a method for manufacturing the same.

BACKGROUND

A battery includes a cell, an electrolyte and an outer packaging film, and the outer packaging film mainly includes a fusion layer, a metal layer and an insulation protection layer. After the cell is sealed, a seal portion of the battery is folded, and a U-shaped tape (or glue) is wrapped around the metal layer exposed at a fracture surface of the seal portion, but the dimensional space utilization of the battery is still insufficient.

SUMMARY

The present application aims to solve at least one of the technical problems existing in the related art. Accordingly, the present application proposes an electrochemical device that has advantages of high dimensional space utilization and great safety performance.

The present application further proposes a method for manufacturing an electrochemical device, and this method is applicable to the above electrochemical device.

The electrochemical device according to embodiments of the present application includes: a first outer case defining an accommodating chamber therein; an electrode assembly accommodated in the accommodating chamber of the first outer case; and a second outer case including a heat shrinkable wrapping layer, the first outer case being wrapped in the heat shrinkable wrapping layer.

The method for manufacturing the electrochemical device according to embodiments of the present application includes: selecting a first outer case, and sealing the first outer case to accommodate an electrode assembly; and arranging the first outer case accommodating the electrode assembly therein in a second outer case for heat treatment, such that the second outer case is shrunk and attached to a surface of the first outer case.

Additional aspects and advantages of embodiments of the present application will be given in part in the following descriptions, become apparent in part from the following descriptions, or be learned from the practice of the embodiments of the present application.

BRIEF DESCRIPTION OF THE DRAWINGS

These and other aspects and advantages of embodiments of the present application will become apparent and more readily appreciated from the following descriptions made with reference to the drawings.

DETAILED DESCRIPTION

Figure 1:
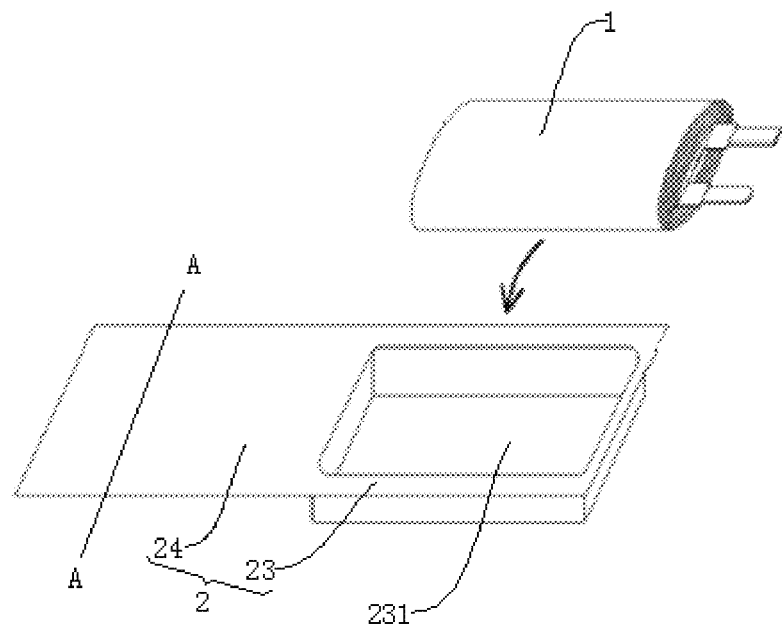
FIG. 1 is a schematic view of a first outer case and an electrode assembly of an electrochemical device according to an embodiment of the present application.

Embodiments of the present application will be described in detail and examples of the embodiments will be illustrated in the drawings, where same or similar reference numerals are used to indicate same or similar elements or elements with same or similar functions. The embodiments described herein with reference to drawings are explanatory, illustrative, and used to generally understand the present application. The embodiments shall not be construed to limit the present application.

In the specification, it is to be understood that terms such as "central," "length," "width," "thickness," "upper," "lower," "inner," "outer," and "circumferential" should be construed to refer to the orientation or position relationship as then described or as illustrated in the drawings under discussion. These relative terms are only for convenience and simplicity of description and do not indicate or imply that the referred device or element must have a particular orientation or be constructed or operated in a particular orientation. Thus, these terms shall not be construed to limit the present application. In the description of the present application, "a plurality of" means two or more than two, unless specified otherwise.

In the description of the present application, it should be understood that, unless specified or limited otherwise, the terms "mounted," "connected," and "coupled" and variations thereof are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

An electrochemical device 100 in the present application includes all devices in which an electrochemical reaction occurs. Specifically, the electrochemical device 100 includes all kinds of primary batteries, secondary batteries, fuel cells, solar cells, and capacitors, such as supercapacitors. Particularly preferred are lithium secondary batteries, including lithium metal secondary batteries, lithium ion secondary batteries, lithium polymer secondary batteries, and lithium ion polymer secondary batteries.

The electrochemical device 100 according to an embodiment of the present application is described below as a lithium battery with reference to FIGS. 1-4.

As illustrated in FIGS. 1-4, the electrochemical device 100 according to the embodiment of the present application includes an electrode assembly 1, a first outer case 2, and a second outer case 3.

Furthermore, the first outer case 2 defines an accommodating chamber therein. The electrode assembly 1 is accommodated in the accommodating chamber of the first outer case 2. The second outer case 3 includes a heat shrinkable wrapping layer, and the first outer case 2 is wrapped in the heat shrinkable wrapping layer.

In the electrochemical device 100 according to the embodiment of the present application, the first outer case 2 is wrapped in the heat shrinkable wrapping layer, such that the first outer case 2 can be effectively covered to enhance the safety of using the electrochemical device 100, and also, the dimensional space utilization of the electrochemical device 100 can be improved, thereby increasing the volumetric energy density of the electrochemical device 100.

Figure 2:
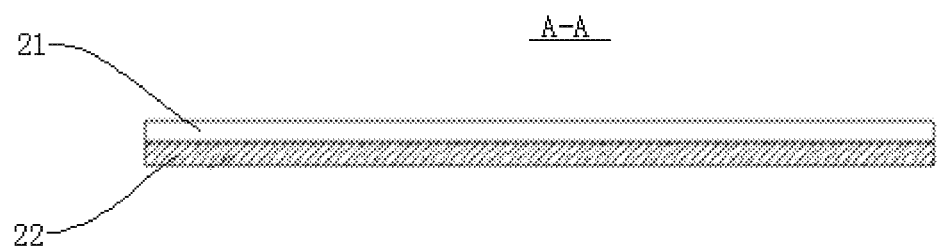
FIG. 2 is a sectional view taken along a line A-A in FIG. 1.

Specifically, as illustrated in FIGS. 1 and 2, the first outer case 2 includes a fusion layer 22 (e.g. a layered structure made of a polymer), and the fusion layer 22 is configured to be in contact with the electrode assembly 1. When the electrode assembly 1 is placed within the first outer case 2, the first outer case 2 will be folded, such that different portions of the fusion layers 22 will be opposite to and in contact with each other, which portions will be fused together to wrap the first outer case 2 around an outer periphery of the electrode assembly 1. In this case, the metal layer 21 is exposed on an outer surface of the first outer case 2.

Figure 3:
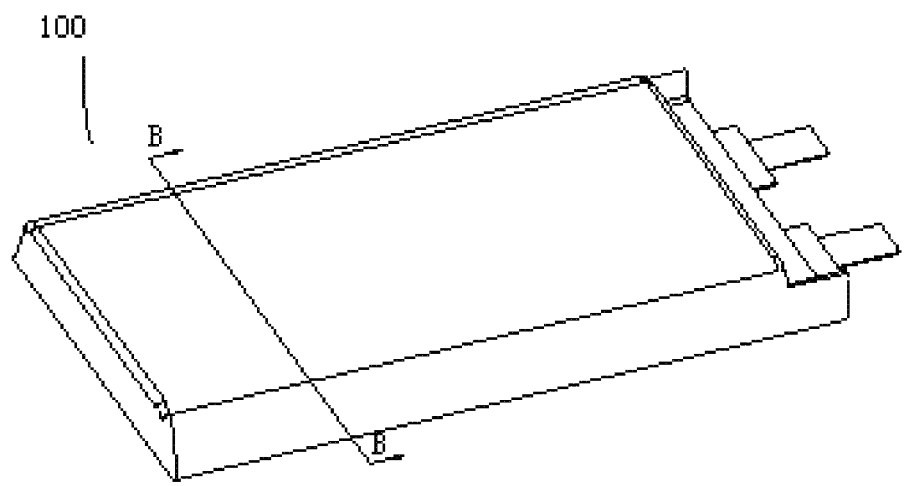
FIG. 3 is a schematic view of an electrochemical device according to an embodiment of the present application.
Figure 4:
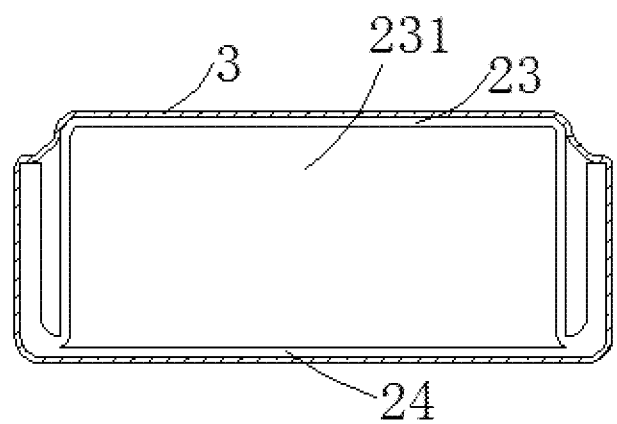
FIG. 4 is a sectional view taken along a line B-B in FIG. 3.

As illustrated in FIGS. 3 and 4, the second outer case 3 includes the heat shrinkable wrapping layer, and the first outer case 2 is disposed between the second outer case 3 and the electrode assembly 1, such that the metal layer 21 of the first outer case 2 can be effectively covered by the second outer case 3. Thus, it is possible to realize the wrapping of the first outer case 2, and also to improve the safety and reliability of the electrochemical device 100.

In the related art, the first outer case wraps the outer periphery of the electrode assembly, and the first outer case is mainly composed of a fusion layer, a metal layer, and an insulation protection layer, in which the fusion layer is disposed adjacent to the electrode assembly, the metal layer is located beside the fusion layer, and the insulation protection layer is the outermost layer. The metal layer is exposed at a fracture surface of the first outer case, and thus the fracture surface thereof is wrapped with a tape or glue. Therefore, since the first outer case 2 is composed of three layers, and the fracture surface is wrapped with the tape or glue, the space utilization of the electrochemical device is still insufficient.

However, in the present application, the first outer case 2 just includes the metal layer 21 and the fusion layer 22, and is wrapped in the heat shrinkable wrapping layer (i.e., the second outer case 3), instead of being wrapped with the tape or glue at its fracture surface, the safety of using the electrochemical device 100 can be enhanced, and also the dimensional space utilization of the electrochemical device 100 can be further improved, thereby increasing the volumetric energy density of the electrochemical device 100.

In some embodiments of the present application, the first outer case 2 includes a first body portion 23 and a second body portion 24, in which the first body portion 23 and the second body portion 24 are configured to define an accommodating chamber to accommodate the electrode assembly 1. That is, the first outer case 2 (including the fusion layer 22 and the metal layer 21 of the first outer case 2) is divided into the first body portion 23 and the second body portion 24. The fusion layer 22 of the second body portion 24 and the fusion layer 22 of the first body portion 23 are fused together after heat treatment, so as to wrap the electrode assembly 1 within the first outer case 2.

Further, as illustrated in FIG. 1, the first outer case 2 is an integrally molded piece, and includes the first body portion 23 and the second body portion 24; the first body portion 23 is provided with a groove 231 to allow the electrode assembly 1 to be embedded in the groove 231, in which the groove 231 can be formed by a molding process; the second body portion 24 and the first body portion 23 may be connected to shield the groove 231 and hence define the accommodating chamber. Thus, the electrode assembly 1 is wrapped within the first outer case 2. In an example illustrated in FIG. 1, the first outer case 2 includes the first body portion 23 and the second body portion 24 that are integrally molded, and the second body portion 24 is provided at one end of the first body portion 23. Before sealing of the first outer case 2, the fusion layer 22 of the first body portion 23 is molded and formed with the groove 231. During the sealing of the first outer case 2, the second body portion 24 is bent relative to the first body portion 23 to shield an opening of the groove 231. The fusion layer 22 of the second body portion 24 and the fusion layer 22 of the first body portion 23 are fused together after the heat treatment, so as to wrap the electrode assembly 1 within the first outer case 2.

Certainly, the present application is not limited thereto. The groove 231 may be provided in the second body portion 24, or each of the first body portion 23 and the second body portion 24 is provided with the groove 231. In addition, the first body portion 23 and the second body portion 24 may be two sheets of the same material, and when the second body portion 24 shields the groove 231 of the first body portion 23, it is only required to ensure that the fusion layer 22 of the first body portion 23 and the fusion layer 22 of the second body portion 24 are opposite to each other.

In some embodiments of the present application, the metal layer 21 has a thickness of 20 to 90 μm, and the fusion layer 22 has a thickness of 20 to 90 μm. Thus, it is possible to improve the dimensional space utilization of the electrochemical device 100 and increase the volumetric energy density of the electrochemical device 100. Further, the thickness of the metal layer is 25 to 45 μm, and the thickness of the fusion layer is 25 to 45 μm. Thus, the dimensional space utilization of the electrochemical device 100 can be better improved, and the volumetric energy density of the electrochemical device 100 can be further increased. Specifically, the thickness of the metal layer 21 is 30 μm, and the thickness of the fusion layer 22 is 30 μm. Thus, not only the dimensional space utilization and the volumetric energy density of the electrochemical device 100 can be improved, but also the processing of the first outer case 2 can be facilitated to shorten the production cycle and reduce the production cost.

In some embodiments of the present application, the metal layer 21 is an aluminum layer. Certainly, the present application is not limited thereto, and the metal layer 21 can also be made of steel, stainless steel or etc.

In some embodiments of the present application, the second outer case 3 has a thickness of 10 to 110 μm. Thus, it is possible to improve the dimensional space utilization of the electrochemical device 100 and increase the volumetric energy density of the electrochemical device 100. Further, the thickness of the second outer case is 15 to 55 μm. Thus, the dimensional space utilization of the electrochemical device 100 can be better improved, and the volumetric energy density of the electrochemical device 100 can be further increased. Specifically, the thickness of the second outer case 3 is 100 μm. Thus, not only the dimensional space utilization and the volumetric energy density of the electrochemical device 100 can be improved, but also the processing of the second outer case 3 can be facilitated to shorten the production cycle and reduce the production cost.

In some embodiments of the present application, the second outer case 3 includes a resin layer or a rubber layer. Specifically, the second outer case may be a polyester resin layer, a polyvinyl chloride resin (PVC) layer, a polypropylene (PP) layer, a polyolefin (PO) layer, an ethylene-vinyl acetate copolymer (EVA) layer, a polyvinyl chloride (PVC) layer, a polyethylene terephthalate (PET) layer, an acrylonitrile-butadiene-styrene copolymer (ABS) layer, a polyethylene (PE) layer, a polytetrafluoroethylene (PTFE) layer, or a silica gel layer. The second outer case 3 made of the above materials can guarantee the safety of using the electrochemical device 100.

In some embodiments of the present application, the second outer case 3 is a heat shrinkable tube. The first outer case 2 in which the electrode assembly 1 is embedded is built in the heat shrinkable tube for heat treatment, such that the heat shrinkable tube is shrunk and attached to a surface of the first outer case 2, and thus the metal layer 21 exposed on the first outer case 2 can be wrapped.

In some embodiments of the present application, the electrochemical device 100 is a pouch battery. The pouch battery has advantages of good safety performance, light weight, large capacity and small internal resistance.

A method for manufacturing an electrochemical device according to embodiments of the present application will be described below with reference to FIGS. 1-4, in which the electrochemical device is the above electrochemical device 100. The method includes the following steps.

First, the first outer case 2 is selected and sealed to accommodate the electrode assembly 1 therein. Second, the first outer case 2 accommodating the electrode assembly 1 therein is placed in the second outer case 3 for heat treatment, such that the second outer case 3 is shrunk and attached to the surface of the first outer case 2, and thus the exposed metal layer 21 of the first outer case 2 can be wrapped and the folded portion can be secured.

In the method for manufacturing the electrochemical device 100 according to embodiments of the present application, the first outer case 2 includes the fusion layer 22 adjacent to the electrode assembly 1 and the metal layer 21 exposed to outside, and the second outer case 3 is wrapped outside the metal layer 21, such that the metal layer 21 can be effectively covered to enhance the safety of using the electrochemical device 100 and also the dimensional space utilization of the electrochemical device 100 can be improved, thereby increasing the volumetric energy density of the electrochemical device 100.

Further, before the first outer case 2 is sealed, one portion of the first outer case 2 is molded to provide the groove 231, and then the electrode assembly 1 is placed into the groove 231. The other portion of the first outer case 2, which is not formed with the groove 231, is folded to shield the groove 231.

Moreover, the one portion of the first outer case 2 and the other portion of the first outer case 2 each include a fusion layer 22, and the first outer case 2 is sealed in such a way that the one portion of the first outer case 2 is connected to the other portion of the first outer case 2 by fusing their respective fusion layers 22 together.

In addition, fused parts of the respective fusion layers 22 are cut and folded towards a side wall of the electrode assembly 1.

Specifically, the first outer case 2 is sealed in such a way that two open sides of the first outer case 2, which are not used for electrolyte injection, are sealed by a heat sealing device, then drying, electrolyte injecting, standing, forming, liquid-extraction and heat sealing processes are applied, then an edge of a seal portion of the first outer case 2 is cut to a predetermined width, and then the seal portion is folded.

In some embodiments of the present disclosure, an edge of the opening of the groove 231 is at a predetermined distance from an edge of the first outer case 2. Thus, the fusion layers 22 can be fused easily to seal the electrode assembly 1 within the first outer case 2.

An electrochemical device 100 and its manufacturing method according to a specific embodiment of the present application will be described with reference to FIGS. 1-4. It should be understood that the following description is only explanatory and aims to interpreter the present application rather than limit the present application.

As illustrated in FIGS. 1-4, the electrochemical device 100 according to the embodiment of the present application includes an electrode assembly 1, a first outer case 2 and a second outer case 3.

Specifically, as illustrated in FIGS. 1 and 2, the first outer case 2 is rectangular, and includes a metal layer 21 and a fusion layer 22 which are stacked in a thickness direction of the first outer case 2. In a length direction of the first outer case 2, the first outer case 2 includes a first body portion 23 and a second body portion 24, the first body portion 23 and the second body portion 24 have the same size, and the first body portion 23 is molded and formed with a groove 231 for accommodating the electrode assembly 1. That is, the metal layer 21 and the fusion layer 22 both include two portions in the length direction of the first outer case 2. In another expression, both the first body portion 23 and the second body portion 24 include the metal layer and the fusion layer in the thickness direction of the first outer case 2.

Further, an edge of an opening of the groove 231 is aligned with a boundary line between the second body portion 24 and the first body portion 23, and other three edges of the opening of the groove 231 away from the second body portion 24 are at a predetermined distance from an edge of the first outer case 2, in which two opposite ones of the other three edges of the opening of the groove 231 are equally distant from the edge of the first outer case 2. The second body portion 24 may be folded by 180° to be opposite to the groove 231, such that the fusion layer 22 on the first body portion 23 comes into contact with the fusion layer 22 on the second body portion 24 in this case, and an edge of the second body portion 24 can be fused with an ungrooved part of the first body portion 23 by means of heat treatment, so as to realize the sealing of the electrode assembly 1. After the sealing is completed, the ungrooved part of the first body portion 23 abuts against a side wall surrounding the groove 231 by vertical folding.

The metal layer 21 is an aluminum layer and has a thickness of 30 The fusion layer 22 is a polymer layer and has a thickness of 30 μm.

In addition, the electrode assembly 1 is formed by winding and laminating a cathode and an anode separated from each other by an isolating membrane, whereby a surface area of the electrode assembly 1 can be maximized. The groove 231 is provided with an electrolyte therein, and the electrolyte is free around the electrode assembly 1 and also infiltrated inside the electrode assembly 1, and is provided within the first outer case 2 along with the electrode assembly 1.

As illustrated in FIGS. 3 and 4, the second outer case 3 is wrapped around an outer periphery of the first outer case 2 to wrap the metal layer 21 exposed on the surface of the first outer case 2 and reliably secure the folded portion. The second outer case 3 is a heat shrinkable tube and has a thickness of 100 μm.

In the electrochemical device 100 according to the present application, the wrapping of the exposed metal layer 21 of the first outer case 2 in the battery and the securing of the folded portion are realized by only one layer of the second outer case 3, which saves three layers of tape (or glue) and two insulation layers in terms of thickness compared to an existing battery construction. Hence, the dimensional space utilization of the electrochemical device 100 can be maximized, and the energy density of the electrochemical device 100 can be improved.

The method for manufacturing the electrochemical device 100 will be described below by taking a pouch battery (battery thickness 3.3 mm, battery width 99 mm, battery length 128 mm) as an example.

The isolating membrane is provided between the cathode and the anode, and the cathode and the anode are wound with each other to form the electrode assembly 1. The first outer case 2 including a fusion layer 22 of 30 μm and an aluminum layer of 30 μm is molded and formed with a groove 231 according to a size of the electrode assembly 1, and the electrode assembly 1 is placed in the groove 231. Subsequently, the other half of the first outer case 2 is folded by 180° to be opposite to the groove 231, such that the electrode assembly 1 is wrapped within the groove 231 of the first outer case 2. The heat sealing device is employed to seal two open sides of the first outer case 2, which are not used for electrolyte injection. Then, a series of processes, such as drying, electrolyte injecting, standing, forming, liquid-extraction and heat sealing processes, are applied to obtain a sealed pouch battery. Further, an edge of a seal portion of the first outer case 2 is cut and then the seal portion is folded to be adjacent to a side wall of the electrode assembly 1. The battery is provided within a PVC heat shrinkable tube with a thickness of 100 μm to undergo the heat treatment, such that the heat shrinkable tube is shrunk and attached to the surface of the first outer case 2, so as to wrap the exposed metal layer 21 of the first outer case 2 and secure the folded portion.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present application. Thus, the appearances of the phrases throughout this specification are not necessarily referring to the same embodiment or example. Furthermore, the particular features, structures, materials, or characteristics may be combined in any suitable manner in one or more embodiments or examples.

Although embodiments of the present application have been illustrated and described, it would be appreciated by those skilled in the art that various changes, modifications, alternatives and variations can be made to the embodiments of the present application without departing from the principle and scope of the present application. The scope of the present application is defined by the claims or the like.

What is claimed is:

1. An electrochemical device, comprising:
   a first outer case defining an accommodating chamber therein;
   an electrode assembly accommodated in the accommodating chamber; and
   a second outer case comprising a heat shrinkable wrapping layer, and the first outer case having a two-layered structure including an inner fusion layer adjacent to the electrode assembly and an outer metal layer stacked on the fusion layer and being wrapped in the heat shrinkable wrapping layer.

2. The electrochemical device according to claim 1, wherein the first outer case comprises:
   a first body portion; and
   a second body portion arranged opposite to the first body portion,
   wherein the first body portion and the second body portion cooperatively define the accommodating chamber.

3. The electrochemical device according to claim 2, wherein the first body portion and the second body portion have a same size.

4. The electrochemical device according to claim 2, wherein at least one of the first body portion and the second body portion defines a groove, the second body portion is connected to the first body portion to shield the groove so as to define the accommodating chamber, and the electrode assembly is embedded in the groove.

5. The electrochemical device according to claim 4, wherein an edge of an opening of the groove is at a predetermined distance from an edge of the first outer case.

6. The electrochemical device according to claim 4, wherein the fusion layer of the first body portion is fused with the fusion layer of the second body portion.

7. The electrochemical device according to claim 1, wherein the first outer case is an integrally molded piece.

8. The electrochemical device according to claim 2, wherein the first body portion is integral with the second body portion.

9. The electrochemical device according to claim 1, wherein the fusion layer has a thickness of 20 to 90 μm.

10. The electrochemical device according to claim 1, wherein the metal layer has a thickness of 20 to 90 μm.

11. The electrochemical device according to claim 1, wherein the second outer case has a thickness of 10 to 110 μm.

12. The electrochemical device according to claim 1, wherein the second outer case comprises at least one selected from a group consisting of a resin layer and a rubber layer.

13. The electrochemical device according to claim 1, wherein the second outer case is a heat shrinkable tube.

14. The electrochemical device according to claim 1, wherein the electrochemical device is a pouch battery.

15. A method for manufacturing the electrochemical device of claim 1, the method comprising:
   selecting the first outer case, and sealing the first outer case to accommodate an electrode assembly; and
   arranging the first outer case accommodating the electrode assembly therein in the second outer case for heat treatment, such that the second outer case is shrunk and attached to a surface of the first outer case.

16. The method according to claim 15; wherein before the first outer case is sealed, one portion of the first outer case is molded and formed with a groove, the electrode assembly is placed in the groove, and the other portion, without being provided with the groove, of the first outer case is folded to shield the groove.

17. The method according to claim 16, wherein the one portion of the first outer case and the other portion of the first outer case each comprise a fusion layer, and the first outer case is sealed in such a way that the one portion of the first outer case is connected to the other portion of the first outer case by fusing the respective fusion layers together.

18. The method according to claim 17, wherein fused parts of the respective fusion layers are cut and folded towards a side wall of the electrode assembly.

19. The method according to claim 16, wherein the first outer case is sealed in such a further way that two open sides of the first outer case, which are not used for electrolyte injection, are sealed by a heat sealing device.

\* \* \* \* \*